Figure 7:
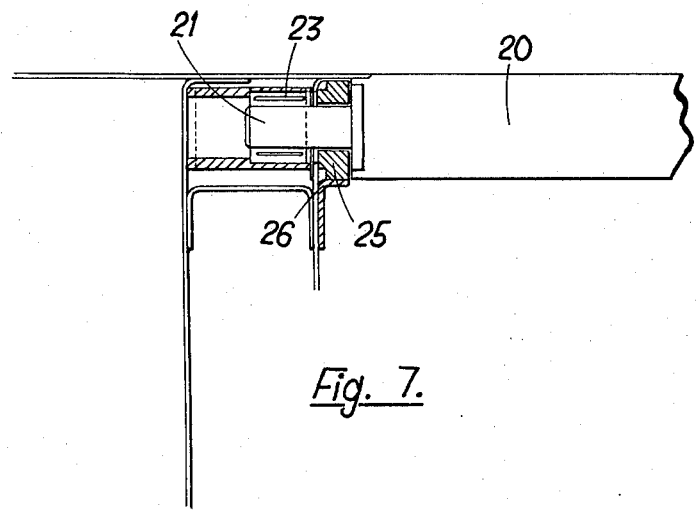

United States Patent [19]
Putnam

[11] 3,910,529
[45] Oct. 7, 1975

[54] AUXILLARY ENGINE PLACEMENT FOR STOL AIRCRAFT

[75] Inventor: Peter Marten Herbert Putnam, Welwyn Garden City, England

[73] Assignee: Hawker Siddeley Aviation Limited, England

[22] Filed: Oct. 1, 1973

[21] Appl. No.: 402,203

[52] U.S. Cl. .............. 244/12 B; 60/226; 244/53 B; 244/55
[51] Int. Cl.² ......................................... B64C 29/00
[58] Field of Search..... 244/12 R, 12 B, 23 B, 23 R, 244/53 B, 53 R, 55, 52, 58, 42 CC, 42 CF, 42 CD, 15; 98/121 R, 121 A; 49/89, 80; 137/15.1, 15.2; 60/226, 269

[56] References Cited
UNITED STATES PATENTS

| | | | |
|---|---|---|---|
| 1,874,523 | 8/1932 | Henrichsen et al. | 244/55 |
| 2,220,520 | 11/1940 | Hein | 49/80 |
| 2,486,407 | 11/1949 | Hoffman | 49/80 |
| 2,788,184 | 4/1957 | Michael | 137/15.1 |
| 3,033,493 | 5/1962 | Wilde et al. | 244/23 B |
| 3,095,165 | 6/1963 | Rowe | 244/12 B |
| 3,110,456 | 11/1963 | Creasey et al. | 244/12 B |
| 3,347,496 | 10/1967 | Opfer | 244/23 B |
| 3,446,223 | 5/1969 | Hancock | 137/15.2 |

FOREIGN PATENTS OR APPLICATIONS 1,247,142   8/1967   Germany.......................... 244/12 B Primary Examiner—Trygve M. Blix
Assistant Examiner—Galen L. Barefoot
Attorney, Agent, or Firm—Rose & Edell

[57] ABSTRACT

In an aircraft having lift fans to provide STOL capability, the fans are powered by the efflux of gas generators buried in the wings, or in sponson structures associated with the wings, each of which gas generators draws its air supply from a plenum chamber within the wing to which the air is admitted from intakes at both the upper and lower wing surfaces. The intakes are provided with self-closing louvre blades which open automatically under the effect of differential pressure when the respective gas generator is started up, except that either the upper intake or lower intake louvre blades, or both, can be locked at will in the shut position.

4 Claims, 8 Drawing Figures

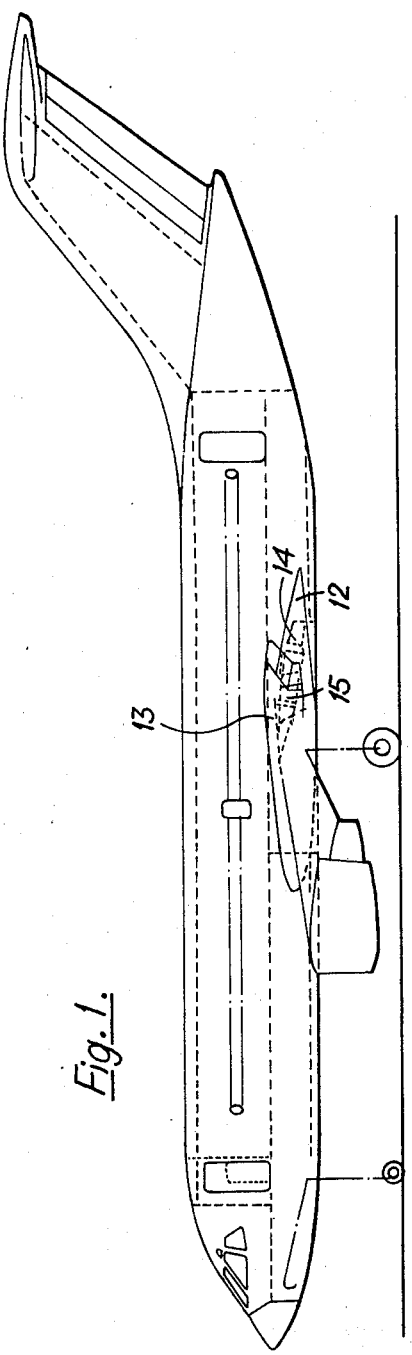
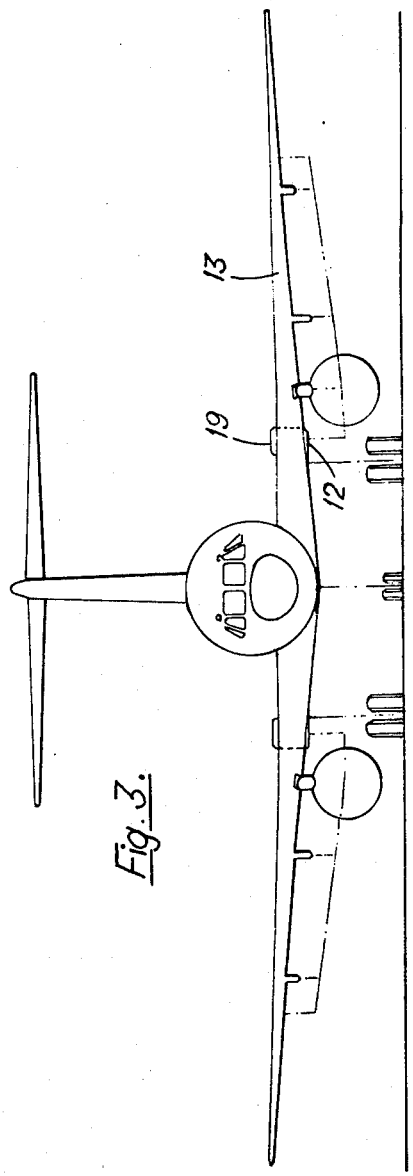

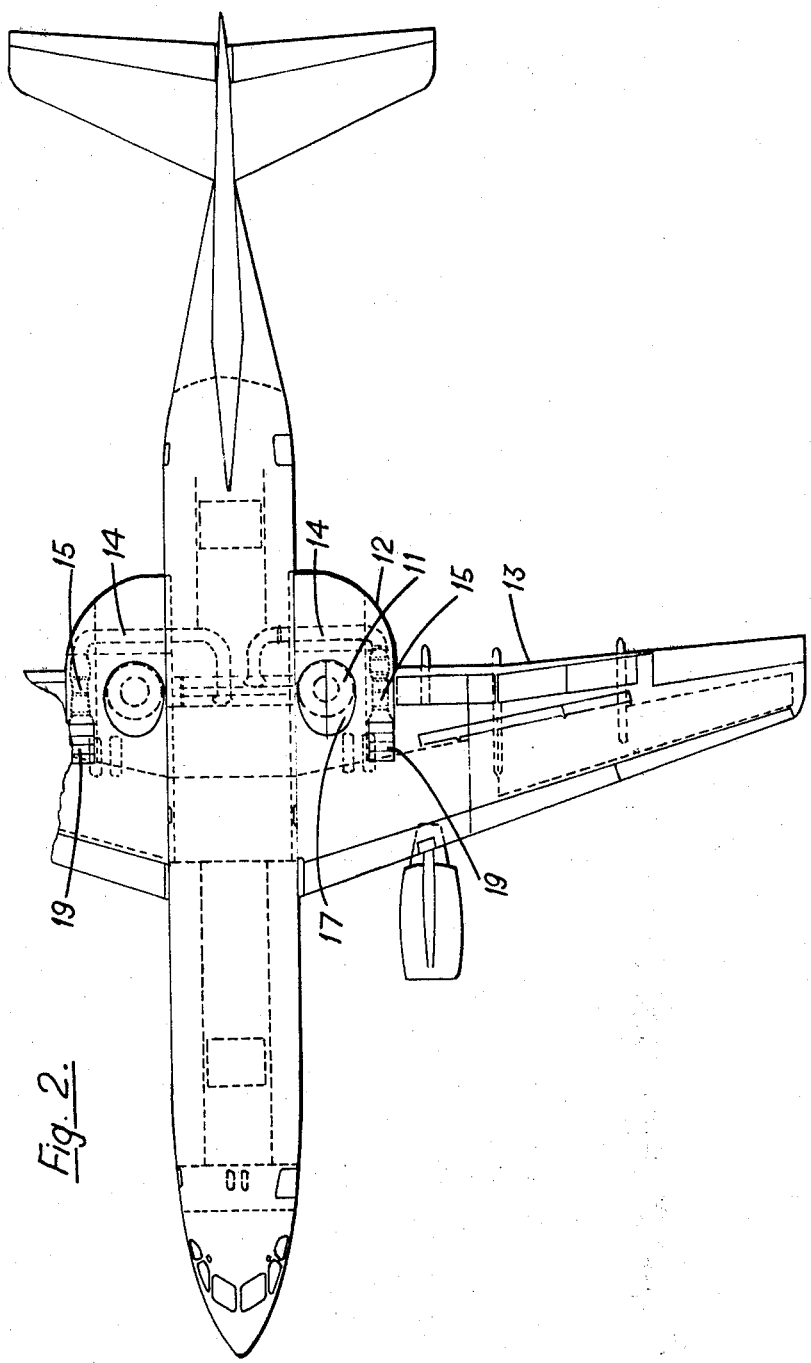

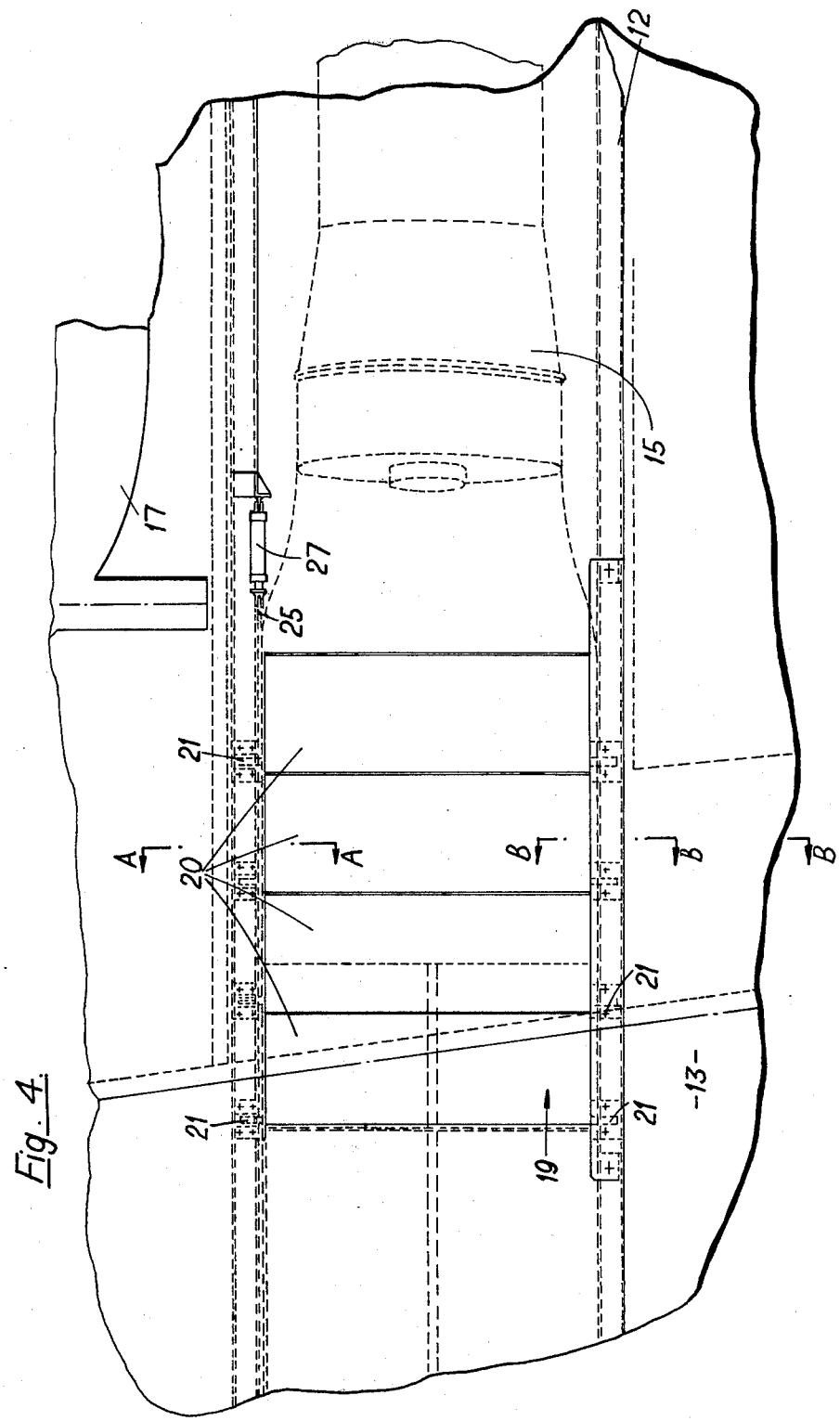

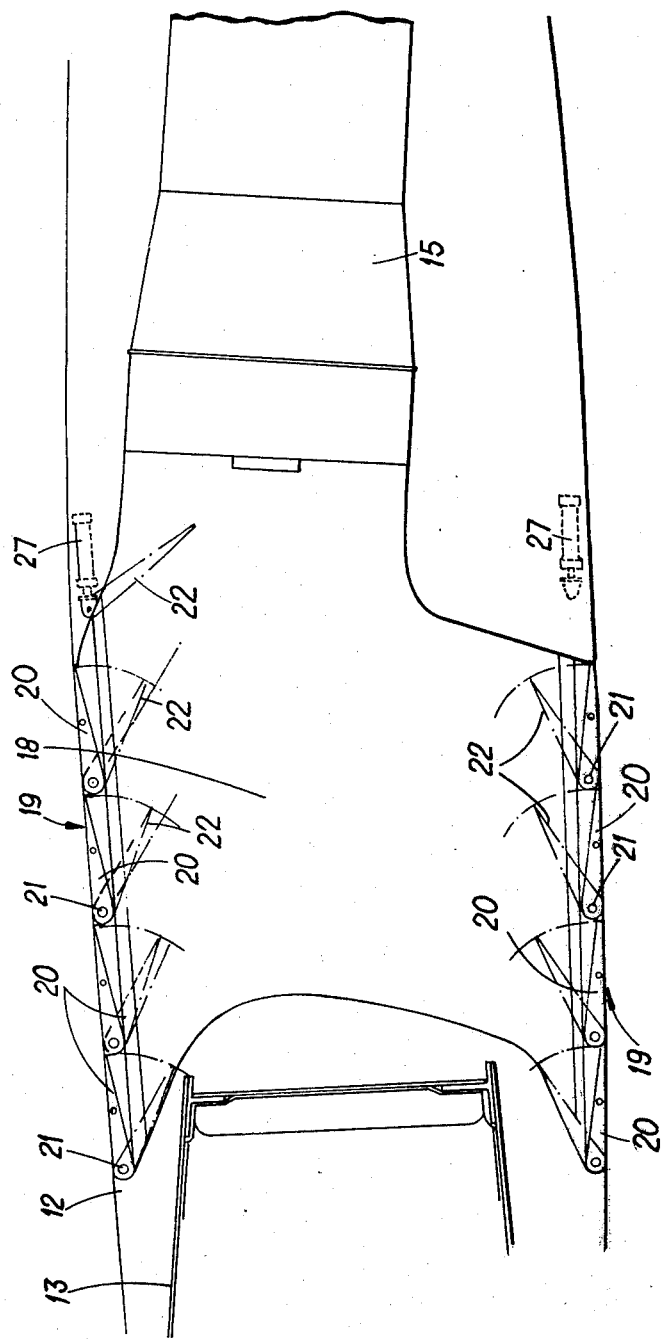

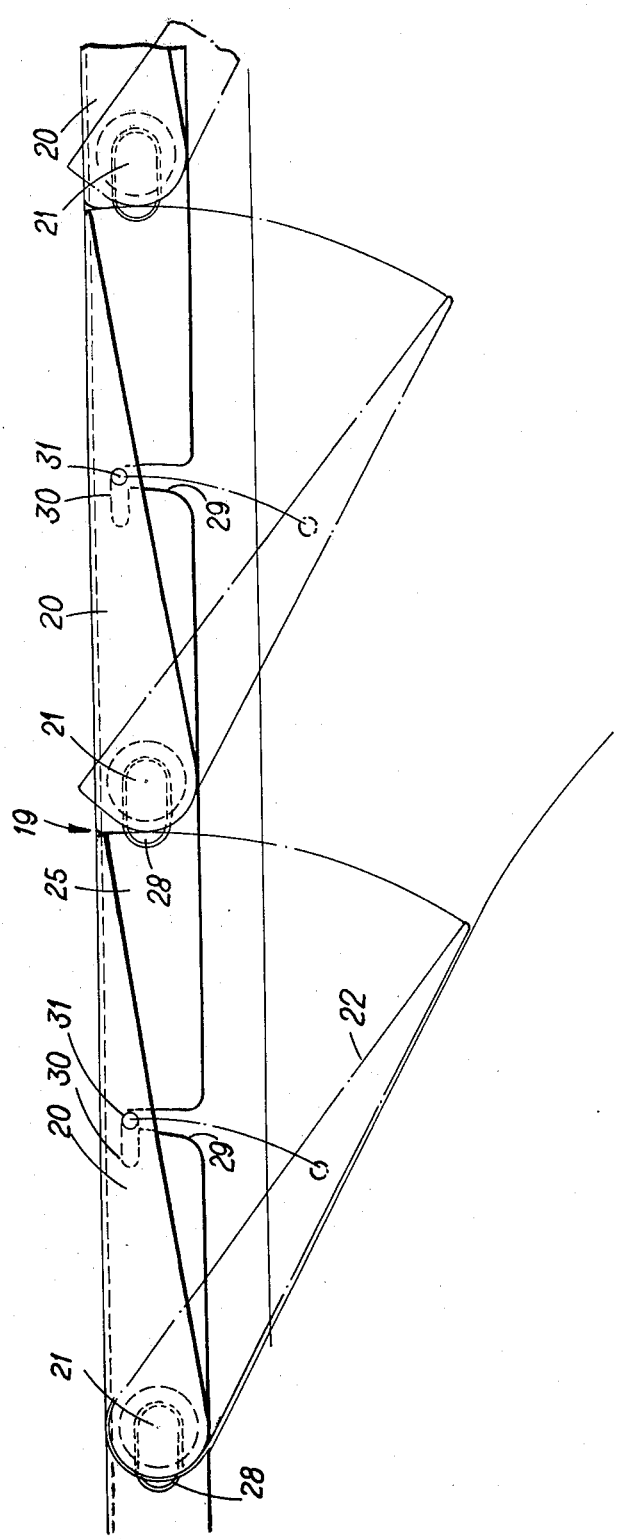

AUXILLARY ENGINE PLACEMENT FOR STOL AIRCRAFT

This invention relates to aircraft, and more particularly aircraft having a short take-off and landing capability (STOL).

It is known in the prior art to provide an aircraft with a means for augmenting the available lift forces during the STOL mode. A pair of lift fans are employed which have their axes substantially vertical and preferably located within the wing structure or in sponson-type rearward extensions of the wings in close proximity to the trailing edge.

In one particular arrangement a pair of lift fans are contained within sponson pods and each driven by respective gas generators that are mounted within the wing/sponson structures and have air intakes at the top surface of the structures. It is an object of the present invention to achieve for such an installation an improved design of air intake.

According to the present invention, there is provided an aircraft with STOL capability, having lift fans powered by the efflux of gas generators buried in wing or sponson structures, with air intake openings in both the upper and lower surfaces of the wing or sponson structures, each gas generator being supplied with air from a plenum chamber within the wing or sponson structure that receives air from both said upper and lower intakes.

Each intake opening may be fitted with a door comprising a number of spring-loaded louvres. The principle of spring-loaded intake doors is well known for providing supplementary air, e.g. when maximum power is required and the conventional fixed intake area is designed for the cruise case. However, the doors employed in the present instance are novel in that they form a complete closure to the total intake area when the gas generator is not in operation, whilst automatically opening directly the gas generator is started up. They are therefore capable of operating at any desired time in any flight mode, although normally used only for the STOL mode and ground running.

The intake door mechanism functions by differential pressure. The plenum chamber allows the gas generator to be started within the confines of the wing/sponson structure with a resultant lowering of pressure in the proximity of the intake louvres. The differential pressure is sufficient to overcome the restraining influence of the louvre springs, the louvres opening inwards to allow intake air to be drawn through the plenum chamber in a continuous manner until shut-down of the gas generator, when the louvres will automatically close to form a smooth external surface conforming to the adjacent wing/sponson profiles.

Further advantages will be evident from the use of intake openings at both upper and lower wing/sponson surfaces. Efficient intake flow can be achieved throughout most variations of flight attitude or incidence changes. For example, high angles of incidence will give high pressure on the wing bottom surface, but low pressure on the upper surface. In this situation the lower intake opening will give maximum performance, the louvres opening to a greater extent to give increased intake flow, whilst a lower pressure differential at the upper intake opening will give a smaller louvre movement and reduced flow. The converse is the case at negative angles of incidence — whereas in a substantially horizontal attitude the flow is more equally divided between the intake openings.

During the ground running phase the problems of debris and hot air ingestion may be overcome by providing a means for locking shut the lower intake. In this way, intake flow will be restricted to the upper surface, the surrounding wing area substantially isolating the intake from any debris which is disturbed by the lift fan efflux.

Figure 8:
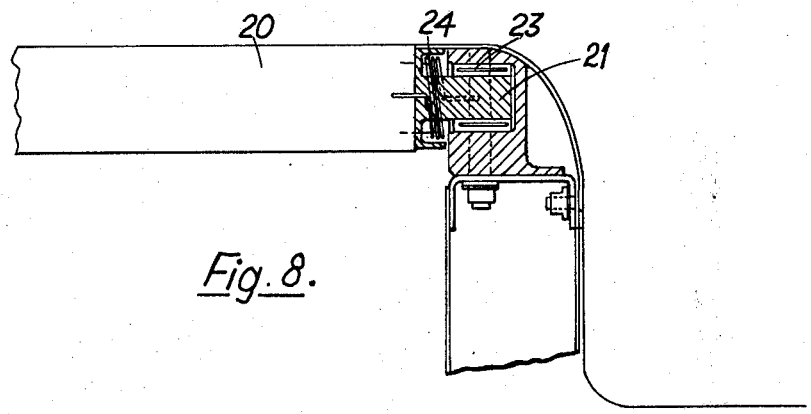

One arrangement according to the invention will now be described in more detail, by way of example, with reference to the accompanying drawings, in which:

FIGS. 1 to 3 show, in side elevation, plan and front elevation, a typical STOL airliner according to the invention, FIG. 4 is a localised plan view of a typical lift fan/gas generator installation, FIG. 5 is a side view of the same installation seen as a section taken through the gas generator longitudinal centre-line, FIG. 6 is a further side view showing details of louvres fitted at an upper air intake opening for the gas generator, FIG. 7 is a detail view in section on the line A—A of FIG. 4, and FIG. 8 is a detail view in section on the line B—B of FIG. 4.

FIGS. 1 to 3 show a STOL airliner provided with a pair of lift fan units 11 located within sponson-type rearward extensions 12 of the wing 13 and having connecting ducting 14 to gas generator units 15 longitudinally disposed within the wing/sponson structures, with louvred air-intake openings 19 at both the wing/sponson upper and lower surfaces.

FIGS. 4 and 5 show the installation on one side of the aircraft to a larger scale. Each lift fan unit 11 contained within the sponson structure 12 has intake doors 17 hingedly movable from a closed position where they conform to the wing/sponson profiles, to an open upstanding position during the STOL and ground running modes to allow the inflow of air to the fans. Although not shown, similar provision is made at the wing lower surface, although the lower doors may, if desired, be replaced by pivotable louvres through which the fans exhaust. The fans 11 are mounted such that the efflux is in a substantially vertical direction.

Each gas generator 15, longitudinally disposed within the wing/sponson structure, has its forward intake end communicating with a plenum chamber 18 whose upper and lower boundaries are formed by the wing/sponson profiles and comprise air intake openings 19. Each intake opening 19 has four spring-loaded louvre doors 20 each pivotally mounted at its leading edge on adjacent wing/sponson structure by means of pivot pins 21 at both ends. These louvres are movable from the closed position, as shown in full lines in FIG. 5, where they form a continuous surface in conformity with the wing/sponson profiles, to inward open positions, as shown in broken lines at 22, whose settings are dependent on intake flow and flight attitude conditions as previously described. The gas generated passes along the ducting 14 to the lift fan units 11, driving these by impingement upon tip turbines.

The pivot pins 21 of the louvre blades 20 are received in roller or needle bearings 23 (FIGS. 7 and 8). The outboard pivot mounting of each louvre blade incorporates a torsion spring 24 as shown in FIG. 8, whereas at the inboard end (FIG. 7) a somewhat extended pivot pin is employed to accommodate a locking bar 25 situated between the end of the louvre blade and the adjacent wing structure, through which bar the pivot pin passes. The locking bar extends fore and aft and is common to all four blades in the respective blade set. Each blade set at each upper and lower intake has such a locking bar and these bars are used to lock shut either or both of the upper and lower blade assemblies as, for example, in a ground running condition when closure of the lower intakes will prevent the admission of foreign matter. The locking bar 25 slides endwise fore and aft on a guide 26, being actuated by a suitable jack 27, and, coincident with each louvre pivot 21, has a slotted hole 28 to allow the fore and aft bar movement. Situated at a position approximately at mid chord of each louvre the locking bar 25 further has a respective arcuate slot 29 extending from its inner edge and terminating in a short length of longitudinal slot 30. This slot formation has engaged in it a pin 31 projecting from the end of the respective louvre blade, when the blades are in the closed position.

Without restraint, the louvres 20 are free to move under the effect of differential pressure, the pins 31 moving along and out of the arcuate slots 29. When a set of intake louvre blades is to be locked, the jack 27 pulling the locking bar rearwards causes each pin 31 to enter the respective longitudinal slot 30.

I claim:
1. An aircraft with STOL capability, comprising:
   wing structure having top and bottom surfaces,
   at least one turbine-driven lift fan to provide lifting thrust,
   at least one gas turbine engine constituting a gas generator buried in said wing structure between said top and bottom surfaces and providing efflux gases to power the lift fan turbine,
   at least one plenum chamber enclosed within said wing structure between said top and bottom surfaces from which plenum chamber said gas generator receives all of its air supply,
   a first air intake opening in said top wing structure surface for admitting air to said plenum chamber,
   a second air intake opening in said bottom wing structure surface for also admitting air to said plenum chamber,
   said first and second air intake openings providing the total air intake area for said plenum chamber,
   closure means for effecting complete closure of the total area of both said first and second intake openings when said gas generator is not in use, said closure means comprising first and second sets of movable louvre blades mounted at said first and second intake openings, respectively, and
   spring means for biasing said louvre blades to close said openings when said generator is not operating and for permitting said louvre blades to open automatically in response to differential pressure created when said generator is operating,
   said plenum chamber being large enough to contain a sufficient volume of air to permit said generator to start when said intake openings are both closed by said louvre blades.

2. An aircraft according to claim 1, wherein locking means is provided for at least the lower intake louvre blades whereby those blades can be locked shut.

3. An aircraft according to claim 2, wherein the upper and lower intake louvre blades have independently operable locking means.

4. An aircraft according to claim 2, wherein the locking means for each set of louvre blades comprises a locking bar shiftable endwise in a fore and aft direction and having slots in which respective pins on the blades engage, the slots and pins being such as to allow unrestrained swinging of the blades in one position of the bar and to lock the blades in another position of the bar.

* * * * *